United States Patent Office 3,755,421
Patented Aug. 28, 1973

3,755,421
PREPARATION OF CARBOXYLIC ACID ESTERS
Donald M. Fenton, Anaheim, and Giovanni Biale, Placentia, Calif., assignors to Union Oil Company of California, Los Angeles, Calif.
No Drawing. Filed June 27, 1968, Ser. No. 740,482
Int. Cl. C07c 69/40, 69/54, 69/66
U.S. Cl. 260—484 R   13 Claims

ABSTRACT OF THE DISCLOSURE

Esters of alpha,beta-ethylenically unsaturated acids, of beta-alkoxy-substituted carboxylic acids and of dicarboxylic acids are obtained by oxidative carbonylation of hydrocarbon olefins. The reaction is performed by contacting the olefin and carbon monoxide with an alcohol in the presence of a Group VIII noble metal in a high oxidation state and a benzene or naphthalene quinone or hydroquinone. In a specific embodiment, ethylene is converted to alkyl acrylates, alkyl beta-alkoxypropionates and dialkyl succinates by contacting ethylene and carbon monoxide at a temperature about 100° C. and about 50 atmospheres with an alkanolic solution of soluble palladium salts and benzoquinone. The reaction results in the production of a large amount of the alkyl acrylate or alkyl beta-alkoxypropionate in preference to the production of byproducts such as alkyl propionates and acetals. The ester of the beta-alkoxypropionate can be readily pyrolyzed to obtain additional quantities of the alkyl acrylate useful as a monomer.

DESCRIPTION OF THE INVENTION

This invention relates to a method for the preparation of esters of alpha,beta-ethylenically unsaturated carboxylic acids, beta-alkoxy-carboxylic acids or dicarboxylic acids from olefins. The ethylenically unsaturated and beta-alkoxy-substituted carboxylic acids are derived from the olefin and contain one more carbon in the acid portion than the parent olefin. The dicarboxylic acids are also obtained from the olefin and contain two more carbons in the acid portion than the parent olefinic compound.

The esters are prepared by the oxidative carbonylation of hydrocarbon olefins using a Group VIII noble metal in an elevated oxidation state as the catalyst and using, as a cocatalyst, a benzene or naphthalene quinone or hydroquinone.

In copending applications Ser. Nos. 375,342 and 426,-382, now U.S. Pat. 3,397,225 and U.S. Pat. 3,397,226, there is disclosed an oxidative carbonylation process using a Group VIII noble metal as the catalyst. In these applications it is disclosed that a soluble salt of a metal having an oxidation potential more positive than that of the Group VIII noble metal can be used as a redox agent for the noble metal catalyst. In this reaction, which can be made continuous by the introduction of oxygen, the Group VIII noble metal serves as a catalyst in that it functions as a coordination site for the reactants and catalyzes the oxidative carbonylation of the olefin, a reaction wherein a hydrogen on an ethylenically unsaturated carbon is replaced with an alkoxycarbonyl group derived from the carbon monoxide and alcoholic reactant. This reaction is illustrated for ethylene by the following reaction:

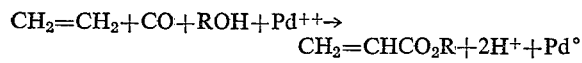

$$CH_2=CH_2+CO+ROH+Pd^{++} \rightarrow$$
$$CH_2=CHCO_2R+2H^++Pd°$$

In the preceding illustration, the Group VIII noble metal is reduced to the metallic state by the oxidation. The aforementioned parent applications disclose the use of redox agents comprising multivalent metal salts which have oxidation potentials more positive than the palladium in the solution and which thereby serve as redox agents. In the presence of such redox agents the Group VIII noble metal is not reduced in valency but is maintained in the active higher valency state so long as a reactive quantity of the higher oxidation state of the multivalent metal salt is present. The reaction thus results in the reduction of the multivalent metal salt from its higher valency to a lower valency and the higher valency is restored by simultaneous or subsequent contacting of the salt with oxygen.

In the processes described in the aforementioned copending applications, side reactions occur which lower the efficiency of the processes for the preparation of the more valuable oxidatively carbonylated products. These side reactions include: nonoxidative carbonylation of the olefin to an ester of a saturated acid; oxidation of the alcohol coreactant and/or olefin to aldehydes, ketones and acetals; and reaction between the alcohol and carbon monoxide reactants to produce carbonates, and/or carbon dioxide.

It is believed that the nonoxidative carbonylation is catalyzed by the Group VIII noble metal in its metallic state and that this catalysis is promoted by the presence of halide ions in the catalyst system. Presence of a finite amount of the metallic form of the Group VIII noble metal is generally unavoidable in the oxidative carbonylation process. Reduction or elimination of halide ions from the reaction system by substituting other anions such as carboxylate or nitrate anions can reduce the nonoxidative carbonylation; however, this substitution generally results in promoting oxidation of the alcohol or olefin to carbonyls or acetals without any increase in the desired oxidative carbonylation.

We have now found that the desired oxidative carbonylation reaction can be favored and the yields of oxidatively carbonylated products increased when the reaction is performed in the presence of catalytic amounts of a quinone or hydroquinone of benzene or naphthalene. The mechanism by which this cocatalyst favors oxidative carbonylation is not known with certainty; the cocatalyst could exert an orientation to the catalyst that would inhibit nonoxidative carbonylation or inhibit general oxidation catalysis and/or it could exert a beneficial effect on the oxidative carbonylation reaction itself.

The quinone can also serve as an oxidant for the Group VIII noble metal catalyst to maintain this catalyst in its oxidized high valency, the reaction thereby resulting in reduction of the quinone to hydroquinone. The hydroquinone can be regenerated by contacting it with oxygen and it thus can serve as a redox agent. Alternatively, other redox agents such as the multivalent transition metals disclosed in the aforementioned copending applications can be used to maintain the active state of the Group VIII noble metal. In either embodiment, the quinone or hydroquinone serves to increase the yields of oxidatively carbonylated products over that obtained in its absence.

Redox agents can optionally be used in the reaction medium to accelerate the rate of reaction. In general, any multivalent metal salt having an oxidation potential higher, i.e., more positive than the platinum metal can be used. Typical of such are the salts of the multivalent metal ions such as the carboxylates, e.g., propionates, benzoates, acetates, etc.; nitrates, sulfates; halides, e.g., bromides, chlorides, etc. of copper, iron, manganese, cobalt, mercury, nickel tantalum, chromium, molybdenum or vanadium. Of these, cupric salts are most preferred. In general, the multivalent metal ion salt is added to the reaction medium or solid supported catalyst to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent or they can be employed jointly with one or more of the aforedescribed redox metal salts such as a combination of a nitrogen oxide and a cupric redox agent. Between about 0.01 and about 3 weight percent of the reaction medium or solid supported catalyst; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into contact with the reaction medium during the oxidation to fix the aforementioned nitrogen oxide content therein or as nitric acid or soluble nitrate or nitrite salts such as sodium nitrate, lithium nitrate, lithium nitrite, potassium nitrate, cesium nitrate, etc. can be added to the reaction medium or solid catalyst.

The oxidative carbonylation reaction can be conducted under relatively mild conditions, e.g., 25° to about 300° C. and pressures from about atmospheric to about 500 atmospheres. The reaction is preferably performed under anhydrous or substantially anhydrous conditions. The reaction can be performed in the presence of a liquid phase in the reaction zone containing the alcoholic reactant and catalyst and this is the preferred mode of practice. The reaction results in the stoichiometric reduction of the redox agent to its lower oxidation state as described in reference to the aforeindicated reaction. The reduced form of the redox agent can be regenerated by various methods so as to provide a continuous preparation of the desired product. The reaction can also be performed under vapor phase processing by impregnating a suitable inert solid with a salt of the Group VIII noble metal and by passing an anhydrous gas mixture of the olefin, alcohol and carbon monoxide over the catalyst at the aforeindicated temperatures and pressures.

Preferably, pressures from about atmospheric to 150 atmospheres are used, the lower pressures being favored for vapor phase processing to avoid formation of a condensed phase in the reaction zone. When the particular quinone or hydroquinone cocatalyst is a solid at the reaction conditions, it can be impregnated on the solid support. When the particular quinone or hydroquinone chosen for use is a liquid or vapor at the reaction conditions, vapors of this cocatalyst can be added to the vapor reactant gas mixture in an amount up to its saturation (dew point) in the vapor mixture. The hydroquinone and excess quinone, if any is present in the product gas effluent, can readily be recovered from the reactor effluent by cooling and condensation.

The regeneration of the redox agent and/or hydroquinone can be performed separate from its reduction in the oxidative carbonylation reaction or can be performed in situ by introducing oxygen into the reaction zone. In liquid phase processing, the reaction can be conducted until substantially all the redox agent has been reduced. The reaction medium containing the ester products, excess reactants, if any are present, and reduced catalyst is withdrawn from the reaction zone and the ester products and excess alcohol reactant are separated by distillation. The concentrated residue of the catalyst and reduced form of the redox agent can then be dissolved in an oxidation resistant solvent such as the $C_1$–$C_8$ carboxylic acids, preferably acetic acid and thereafter contacted with oxygen at a temperature of 125° to 350° C. to oxidize the redox agent to its higher oxidation state. Prior to reuse of the catalyst solution, the water formed in the oxygen regeneration of the redox agent can be removed by simple distillation and this distillation can also remove the oxidation resistant solvent, e.g., acetic acid. The quinone and Group VIII noble metal catalyst can then be dissolved in fresh solvent, or in the recycle reaction solvent removed in the crude product distillation step, and then recycled to the oxidative carbonylation zone. If desired, the oxidation of the reduced redox agent can also be effected without the added carboxylic acid solvent.

With vapor phase processing, any hydroquinones which have an appreciable vapor pressure at the reaction conditions are removed with the vapor effluent from the reactor. Condensation of the effluent and subsequent fraction to recover the ester products also effects separation of the hydroquinones. The hydroquinone can then be contacted with oxygen as previously described to oxidize the hydroquinone to the quinone.

In situ regeneration of the catalyst and redox agent can also be performed by introducing oxygen into the reaction zone simultaneously or intermittently with introduction of the carbonylation reactants.

The cocatalyst employed in the oxidative carbonylation zone is a hydroquinone or quinone of benzene or naphthalene. As used herein, the terms "quinone" and "hydroquinone" are generic to benzoquinone and naphthoquinone and to benzohydroquinone and naphthohydroquinone. These cocatalysts can also be used as the redox agent and up to four of the ring hydrogens can be replaced with various substituents. The substitution of the aromatic rings does not substantially alter the reactivity or operability of the aforeindicated quinones or hydroquinones for functioning as redox agents. The substituents, however, can slightly influence their oxidation reduction potential and, preferably, electron withdrawing substituents are used which increase the oxidation potential of the quinone and thereby increase their reactivity as oxidants.

Examples of suitable electron withdrawing groups include halogens, nitro groups, hydroxy groups, cyano groups, sulfonic acid and salts thereof, and carboxylic acid groups, salts and esters thereof.

The following will indicate various suitable derivatives of quinone which can be employed in the reaction as a redox agent: 1,2-benzoquinone, 1,4-benzoquinone, halo derivatives thereof, e.g., 2,6-dichlorobenzoquinone, 2,3,5-trichloro-1,4 - benzoquinone, tetrachlorobenzoquinone, 2,3-dichloro-5,6-dicyano-1,4-benzoquinine, 2,5 - difluorobenzoquinone, 2,3 - dicyanobenzoquinone, 2,5 - dinitrobenzoquinone, 2,5-dibromo-1,4-dioxobenzene - 5 sulfonic acid and its alkali metal, ammonium and $C_1$–$C_5$ alkyl ammonium salts such as the sodium, lithium, potassium, ammonium, dimethylammonium, tetramethylammonium, diisopropylammonium, amylammonium, salts thereof; 2,6-dicarboxy-1,4-benzoquinone, 2,6-dichloro-3,5 - dicarboxy-1,4-benzoquinone, as well as the alkali metal, ammonium and $C_1$–$C_5$ alkyl ammonium salts thereof, e.g., sodium, potassium, lithium, cesium, ammonium, tetramethylammonium, amylammonium, diethylammonium, diisopropylammonium, etc. The esters of the aforementioned carboxylic acid derivatives can also be employed, e.g., 2-carbomethoxy-1,4-benzoquinone, 2,6-dicarboethoxy - 1,4-benzoquinone, 3,6-dicarbobutoxy - 4,5 - dichloro - 1,2-benzoquinone, etc. The hydroquinone of any of the aforementioned is formed from the quinone during the reaction. If desired, however, the hydroquinone of any of the aforementioned can be introduced into the reaction zone rather than the quinone. Accordingly, the hydroquinones, i.e., reduced forms of all of the aforementioned, are also suitable cocatalysts.

Naphthoquinone, naphthohydroquinone and derivatives thereof can also be used as redox agents. Examples of suitable naphthoquinones include 1,2-naphthoquinone, 1,4-naphthoquinone and 2,6-naphthoquinone and the substituted derivatives thereof. Suitable substituents include the electron withdrawing groups such as hydroxy, nitro, halo, sulfonic acid, cyano, or carboxylic acid groups. Examples of suitable materials include 2,3-dichloronaphthoquinone, 6-hydroxy-1,2-naphthoquinone, 5,8-dihydroxy-1,4-naphthoquinone, 5-cyano-1,4-naphthoquinone, 2,7-dicyano-1,4-naphthoquinone, 7-carboxy - 1,2 - naphthoquinone, 5,8-dicarboxy-1,4 - napthoquinone, 2,6 - naphthoquinone-4-sulfonic acid and the alkali metal, ammonium and $C_1$–$C_5$ alkylammonium salts thereof, e.g., sodium, potassium, lithium, ammonium, diisopropylammonium, tetramethylammonium, amylammonium, etc. The carboxylic acids previously mentioned can also be used as the salts or esters thereof, e.g., 5,8-dicarbomethoxy-1,4-naphthoquinone, 7-carbobutoxy-1,2-naphthoquinone, etc. The hydroquinones of any of the aforementioned can also be used as the cocatalyst.

Referring now to the alcoholic reactant which in liquid phase processing can also constitute the reaction medium, any alkyl, cycloalkyl, aryl, alkaryl or aralkyl monohydroxy alcohol having from about 1 to 10 carbons can be employed such as methanol, ethanol, propanol, isopropanol, butanol, isobutanol, pentanol, isopentanol, hexanol, heptanol, octanol, nonyl, decanol, etc. Preferably, alkanols having about 1 to 6 carbons are used. Cyclic alcohols such as cyclohexanol, cyclopentanol, 2-ethylcyclohexanol, etc., can be employed. Phenol, naphthol, ortho, meta or para cresol, cumenol, xylenol, etc. can also be employed if desired, as well as benzyl alcohol and substituted benzyl alcohols such as p-methylbenzyl alcohol, o - ethylbenzyl alcohol, m - isopropylbenzyl alcohol, etc.

As previously mentioned, the alcohol can be used in excess and comprise the reaction medium for the liquid phase. If desired, however, other organic solvents which are liquid at the reaction conditions and inert to the reactants and products can also be employed. Such solvents include for example: various ethers such as methylethyl ether, diethyl ether, diisopropyl ether, ethylene glycol diisoamyl ether, ethyl benzyl ether, diethylene glycol diethyl ether, triethylene glycol diethyl ether, tetraethylene glycol dimethyl ether, etc.

Various esters can also be employed as the solvents such as methyl acetate, ethyl acetate, isopropyl acetate, ethyl propionate, n-butyl formate, sec-butyl acetate, isobutyl acetate, ethyl n-butyrate, n-butyl acetate, isoamyl acetate, n-amyl acetate, glycol diformate, isoamyl n-butyrate, ethyl acetylacetate, diethyl oxalate, glycol diacetate, isoamyl isovalerate, methyl benzoate, ethyl benzoate, methyl salicylate, n-propyl benzoate, n-dibutyl oxalate, etc.

Saturated hydrocarbons can also be used such as pentane, hexane, heptane, octane, decane, dodecane, mineral koils, etc.

The oxidative carbonylation can also be performed in heterogeneous vapor phase catalysis by employing the catalyst neat or supported on a suitable inert support in the reaction zone. Any support or carrier which is a solid and inert to the reaction can be used such as titania, zirconia, alumina, silica, etc., or combination of these materials. Examples include alumina, silica stabilized alumina containing from 1 to 15 percent silica as described in U.S. Pat. 2,437,532, the aluminum silicates, clay, naturally occurring or synthetically prepared zeolites such as chabazite, gnelenite or faujasite, as well as synthetic zeolites. The latter materials are partially dehydrated crystalline compositions of silica and alumina and contain quantities of one or more exchangeable cations such as sodium, potassium, hydrogen, magnesium, calcium, etc. The compositions and their preparation are described in U.S. Pats. 2,882,243 and 2,882,244. These compositions are characterized by crystal pores of relatively uniform pore diameter between about 5 and 14 angstrom units. Several crystal forms of such molecular sieves are available and suitable for use herein as the carrier for the catalyst, redox agent and cocatalyst components of my invention including the X, Y, L and J crystal types. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of salts of the Group VIII noble metals, redox metal or nitrogen oxide salts, and the quinone or hydroquinone cocatalyst.

The catalyst particle size can vary over wide limits from about 0.5 inch to about 1 micron average diameter. The particle size selected depends on the type of solid-vapor contacting employed in the reaction zone. A disperse gas phase reaction would employ the very fine particles passing about a 325 mesh scheen. Use of a fluidized bed reactor would require use of particles passing a 20 but retained on a 400 mesh screen. Packed bed reactors, which are preferred, would use the larger diameter particles having diameters from 0.05 to 0.5 inch, preferaby from about 0.1 to 0.25 inch. The specific suface of the catalyst can also vary widely, from about 10 to 800 square meters per gram.

The noble group metal component of the catalyst when distended on a solid carrier can be employed in an amount from about 0.01 to about 25 weight percent of the final catalyst. Preferably the noble metal is employed in a concentration from about 0.5 to about 10 weight percent based on the final catalyst. The noble metal can be distended on the carrier by impregnation of the carrier with a solution af a salt, complex or chelate of the noble metal. The impregnation can be achieved by evaporating the solvent from the admixture of inert carrier and catalyst solution or by addition of a precipitating agent to form an insoluble salt or hydroxide of the noble metal. The catalyst is thereafter dried and can be used in the oxidative carbonylation. The quinone or hydroquinone, when incorporated in the catalyst, can be impregnated by admixture of the solid and a solution of the quinone or hydroquinone followed by evaporation of the solvent to provide from 0.01 to about 20, preferably from 1 to about 10 weight percent quinone on the final catalyst.

The acid portion of the ester produced in accordance with my invention is derived from the olefin and contains one or two more carbons in the acid chain than the olefin. The preparation of beta-alkoxycarboxylic esters is included in this description since the alkoxy group is not in the carbon chain of the acid but is a dependent group which can be readily pyrolyzed from the ester. Accordingly, the identity of the product desired dictates the choice of hydrocarbon olefin; acrylates requiring the use of ethylene. Esters of higher unsaturated acids, however, can be obtained from other olefins and the following are typical of olefins which can be reacted; ethylene, propylene, butene-1, butene-2, isobutene, pentene-1, pentene-2, 2-methylbutene-1, 2-methylbutene-2, cyclopentene, hexene-1, hexene-2, hexene-3, cyclohexene, 2-ethylbutene-1, 2-methylpentene-1, heptene-3, cycloheptene, 1-methylcyclohexene, 1-octene, isooctene, cyclooctene, 1-ethylcyclohexene, 1-nonene, isononene, 1-decene, 1-butylcyclohexene, 1,3-diethylcyclohexene, isodecene, indene, styrene, alphamethylstyrene, allylbenzene, etc. In general, any hydrocarbon olefin having from about 2 to about 10 carbons, preferably from about 2 to about 6 carbons, can be employed in the reaction provided that at least one of the unsaturated carbons is bonded to a hydrogen to form an available oxidation site.

The reaction is performed under anhydrous or substantially anhydrous conditions at temperatures from about 25° to 300° C., preferably from about 100° to about 225° C. When liquid phase processing is used, the pressure employed should be sufficient to maintain a liquid phase in the reaction zone. Preferably, elevated pressures to increase the solubility of the gaseous reactants in the liquid reaction medium are employed, e.g., pressures from about 5 to about 200 atmospheres; most preferably from about 30 to about 100 atmospheres. In vapor phase processing, the pressures used can be from atmospheric to about 500 atmospheres; preferably from 2 to about 20 atmospheres. As previously mentioned, the reaction is performed by introducing the hydrocarbon olefin and carbon monoxide and alcohol into contact with a benzene or naphthalene quinone or hydroquinone and a platinum group metal in an elevated oxidation state.

The platinum group metal can be of the platinum subgroup, i.e., platinum, iridium or osmium or of the palladium subgroup, i.e., palladium, rhodium or ruthenium. Palladium is preferred because of its demonstrated greater activity. In general, the platinum group metal can be employed in amounts between about 0.001 and 5.0 weight percent of the liquid reaction medium; preferably between about 0.04 and about 0.5 weight percent. The platinum group metal can be introduced into the reaction medium as a finely divided metal, as an oxide, as a soluble salt or as a complex. Examples of suitable metal containing sources are the oxides, halides, sulfates, nitrates and salts of the lower $C_1$–$C_5$ carboxylates such as palladium oxide, palladium chloride, rhodium oxide, rhodium acetate, ruthenium dioxide, ruthenium bromide, osmium tetroxide, osmium trifluoride, iridium dioxide, iridium butyrate, iridium nitrate, palladium sulfate, platinum dichloride, platinum propionate or acetate, etc.

The Group VIII noble metals readily form complexes with various ligands such as the nitroso, halo or biphyllic ligand complexes and any of these can be used as the noble metal catalyst source. Complexes involving ligands with two or more complexing sites spaced in sufficient proximity to form a ring structure with the metal are chelates and any chelate of a Group VIII noble metal and a conventional metal chelating agent can be used.

Examples of suitable nitroso complexes include tris-triphenylphosphine nitroso rhodium, tris-triphenylarsine nitroso rhodium, tris-triphenylphosphine nitroso iridium, rhodium nitroso bromide, palladium nitroso chloride, etc. Examples of halo complexes include: potassium hexafluororuthenate, sodium hexachloroosmate, lithium hexachloroiridate, chloroplatinic acid, sodium fluoropallate, etc.

Complexes of the Group VIII noble metal and a biphyllic ligand can also be used. In accordance with the subject matter disclosed and claimed in copending application Ser. No. 575,980, now U.S. Pat. 3,530,168, the presence of the biphyllic ligand in the reaction zone inhibits carbonate formation which is caused by reaction of the carbon monoxide with the alcohol reactant. This inhibition thus increases the yield of oxidatively carbonylated products based on the carbon monoxide or alcohol reactants. The biphyllic ligand employed is a compound having an element with a pair of electrons capable of forming a coordinate bond with a metal atom and simultaneously having the ability to accept an electron from the metal of the catalyst. In this manner, the ligand imparts stability to the resulting complex of the catalyst. Biphyllic ligands can comprise organic compounds having at least about 3 carbons and containing arsenic, antimony or phosphorus in a trivalent state. Of these, the phosphorus compounds, i.e., the phosphines, are preferred; however, the arsines or stibines can be employed. In general, these biphyllic ligands have the following structure:

or the following structure:

wherein E is a trivalent atom selected from the class consisting of phosphorus, arsenic and antimony; and
wherein R is a member of the class consisting of hydrogen, alkyl from 1 to 8 carbon atoms, aryl from 6 to 8 carbons and halo and alkoxy substitution products thereof; and
wherein R' is alkylene having from 1 to about 8 carbons.

Examples of suitable biphyllic ligands having the aforementioned structure and useful in my invention to stabilize the catalyst composition are the following: trimethylphosphine, triethylarsine, triisopropylstibine, diethylchlorophosphine, triaminobutylarsine, ethyldiisopropylstibine, tricyclohexylphosphine, triphenylphosphine, tri(o-tolyl)phosphine, phenyldiisopropylphosphine, phenyldiamylphosphine, diphenylethylphosphine, chlorodixylylphosphine, chlorodiphenylphosphine, tris(diethylaminomethyl)phosphine, ethylene bis(diphenylphosphine), hexamethylene bis(diisopropylarsine), pentamethylene bis(diethylstibine), etc. Of the aforementioned, the aryl phosphines are preferred because of their demonstrated greater activity for stabilization of Group VIII noble metal catalysts. The complex of the Group VIII noble metal and biphyllic ligand can be preformed or the components thereof can be added separately to the reaction zone.

Various chelates of Group VIII noble metals can be used such as the metal complexes with 1,3-diketones such as acetylacetone, propionylacetone, butyrolactone, nonanoylacetone, benzoylacetone, etc.

If desired, a suitable dehydrating agent can be used to maintain the reaction under anhydrous conditions. Examples of suitable organic dehydrating agents which, for ease of handling, have from 2 to about 25 carbons are alkyl acetals and ketals such as 1,1-diethoxyethane, 1,1-dibutoxyethane, 2,2 - dimethoxypropane, 2,2 - diethoxybutane, 1,1 - diisopropoxypropane, 3,3 - dipentoxyhexane, 1,1-dimethoxycyclohexane, etc.; alkyl orthoesters such as ethyl orthoformate, methyl orthoformate, butyl orthoacetate, ethyl orthoacetate, etc.

As previously mentioned, the oxidation of the reduced redox agent, e.g., the reduced multivalent metal salt or the hydroquinone can be effected in situ with the oxidative carbonylation or in a step separate from the reaction step where the olefin and carbon monoxide are contacted with the solution. In this regeneration, oxygen or an oxygen-containing oxidizing compound can be employed to regenerate the redox agent. Since hydroquinones often require relatively strong oxidizing conditions, when it is desired to convert the hydroquinone to the quinone, it is preferred that the hydroquinone be first separated from the alcoholic reactant or the reaction solvent to preclude oxidation of the alcohol and resultant loss in efficiency of the process. This separation can be accomplished by distillation, solvent extraction or simply by precipitation. A suitable regeneration comprises introducing a stream of oxygen or mixture of oxygen and an inert gas, e.g., nitrogen, etc., into contact with the hydroquinone which can be neat or suspended or dissolved in an oxidation resistant solvent, e.g., water, a $C_1$–$C_5$ alkanoic acid such as acetic acid, propionic acid, etc. or mixtures of water and the alkanoic acid. Temperatures from about 20° to about 350° C. are sufficient for this operation and the presssures employed are sufficient to maintain the reaction solvent in the liquid phase, e.g., atmospheric to about 2000 p.s.i.g.

Because the oxygen oxidation of the hydroquinone forms water, the quinone is dehydrated before again contacting it with the olefin, carbon monoxide and catalyst. Preferably, the water can be vaporized from the reaction medium and this vaporization can be facilitated by stripping the reaction medium within an inert gas such as combustion gases, nitrogen, etc., or by continuing to introduce oxygen or air into the solution after oxidation has been effected to strip the water from the solution. Alternatively, the quinone can be extracted from the regeneration medium with a suitable solvent. To facilitate removal of the water, the pressure in the quinone dehydration can be subatmospheric, atmospheric or slightly elevated above atmospheric, e.g., from about 20 millimeters mercury to about 10 atmospheres. All or a portion of the water can also be removed by the addition of sufficient quantities of any of the aforementioned dehydrating agents. Since the oxidation of the hydroquinone can also be catalyzed by a Group VIII metal such as rhodium or salts thereof, the aforementioned regeneration can also be performed in the presence of catalytic amounts of the rhodium metal or a soluble rhodium salt.

The desired oxidative carbonylation reaction forms the esters of an unsaturated acid, dicarboxylic acid and/or beta-alkoxy alkanoic acid. When operating in a continuous fashion, a portion of the liquid reactants can be continuously removed from the reaction zone and the esters purified therefrom. A suitable purification step comprises, e.g., azeotropic distillation of the liquid to remove the esters and alcoholic reactant if they form an azeotrope from the balance of the alcohol which is returned to the reaction zone. When the particular alcohol and ester do not form an azeotrope, any other known azeotroping agent can be added to obtain the ester in the volatile fraction from the crude product. The higher boiling products can be removed by conventional distillation.

Relative ratios of the carbon monoxide based on the olefin can be from 1:10 to 10:1 molecular units per molecular unit of olefin, preferably ratios from about 1:1 to about 5:1 and most preferably from 1:1 to 2:1 molecular ratios are employed. The alcohol should be supplied to the oxidative carbonylation zone or be present therein in at least an equal molar quantity to the olefin and is preferably employed in excess of this quantity, e.g., up to about 5 times the mole quantity of the olefin. With liquid phase processing, as previously mentioned, the alcohol is a preferred reaction solvent and is thus present in excess.

When in situ regeneration of the redox agent is practiced, oxygen can be added to the reactants in an amount comprising up to about 10 to 15 volume percent of the reactants, greater amounts being undesired to insure that explosive gas mixtures are not present. With liquid phase processing the oxygen can be introduced into the liquid phase separate from the gaseous reactants such as carbon monoxide and the lower molecular weight olefins and the oxygen introduction rate relative to the other reactants can be controlled so as to maintain the oxygen content in the reactor vapor phase or vapor effluent therefrom less than about 5 and preferably less than about 1 volume percent.

The products from a vapor phase reaction are, of course, recovered from the vapor effluent. The products from a liquid phase reaction can be continuously stripped or vaporized from the reaction medium and removed in a vapor effluent or a portion of the liquid reaction medium can be continuously or intermittently withdrawn and the products recovered therefrom. In either processing, unreacted gaseous or liquid reactants can be recycled to the reactor in accordance with conventional processing.

To permit a continuous reaction when using a separate regeneration step with liquid phase processing a portion of the catalyst salts can also be withdrawn, preferably in admixture with the liquid product and, after recovery of the ester product, the catalyst can be regenerated by any of the aforementioned separate regeneration schemes. The regenerated solution can then be recycled to the oxidation zone. To permit a continuous reaction when using separate redox agent regeneration with vapor phase processing, a plurality of reactors packed with the catalyst can be used with the reaction and regeneration steps being switched alternately between the reactors.

The following examples will illustrate a mode of practice of my invention and demonstrate the results obtainable thereby:

Example 1

The oxidative carbonylation of ethylene is performed by charging one gram palladium chloride, 10 grams benzoquinone, 100 milliliters of ethanol to a tantalum bomb and then adding ethylene to 800 p.s.i.g. and carbon monoxide to 1000 p.s.i.g. The mixture is rocked and heated to 100° C. for two hours and then heated to and maintained at 150° C. for an additional two hours. Upon completion of the reaction period the bomb is cooled, depressured and opened and the liquid contents distilled to recover 2 grams ethyl acrylate and 0.5 gram of ethyl beta-ethoxypropionate. There is no production of ethyl propionate and no diethyl succinate in the reaction.

Example 2

Example 1 is repeated by charging to the bomb one gram palladium chloride, 10 grams benzoquinone and 100 milliliters methanol and adding ethylene to 500 p.s.i.g. and an equal amount of carbon monoxide to raise the pressure to 1000 p.s.i.g. The mixture is rocked and heated to 100° C. for 2 hours and then heated to and maintained at 150° C. for an additional 2 hours. The final reaction pressure upon cooling to room temperature is 700 p.s.i.g. The bomb is cooled, opened and products are distilled to recover 0.8 gram ethyl acrylate, 6.4 grams ethyl beta-ethoxy propionate and 2.6 grams of diethyl succinate.

Example 3

The oxidative carbonylation of Example 1 is repeated by charging to the bomb 1 gram powdered palladium metal, 15 grams p-benzoquinone and 100 milliliters ethanol. Ethylene is added to 400 p.s.i.g. and carbon monoxide is then added to 800 p.s.i.g. The bomb is rocked and heated to and maintaianed at 125° C. for 6 hours. An inspection of the products reveals that ethyl acrylate is the major product.

Example 4

Example 1 is repeated by charging 5 grams palladium chloride, 10 grams naphtho-1,4-dihydroquinone and 100 milliliters of ethanol. The bomb is pressured to 400 p.s.i.g. with ethylene, then to 800 p.s.i.g. with carbon monoxide and heated to and maintained at 125° C. for 2 hours. An analysis of the products reveals that beta-ethoxypropionate and diethyl succinate are the major products.

Example 5

For comparative purposes, an experiment is performed by charging the bomb with 17 grams cupric chloride, 1 gram palladium chloride and 100 milliliters ethanol. The bomb is pressured to 500 p.s.i.g. with ethylene and then 500 p.s.i. of carbon monoxide is added. The bomb is rocked and heated to and maintained at 100° C. for 2 hours then heated to and maintained at 15 C. for 2 hours. The bomb is cooled, depressured and opened and the contents analyzed to determine that 5 grams diethyl acetal and 5 grams of mixed ethyl propionate and ethyl acrylate are produced.

Example 6

A titanium-lined, half-gallon autoclave is charged with 0.5 gram palladium oxide, 2.5 grams cupric nitrate, 2.5 grams naphthoquinone, 4 milliliters concentrated nitric acid and 300 grams ethanol. The autoclave is closed, pressured to 400 p.s.i.g. with ethylene and an additional 400 p.s.i. with carbon monoxide, then heated to and maintained at 250° F. while oxygen is slowly introduced in 20 p.s.i. increments over a 15 minute period. The autoclave contents are recovered and analyzed to reveal the following product yields based on ethylene: 37.5 percent ethyl-beta-ethoxypropionate and 62.5 percent diethyl succinate. The reaction also produced 8.1 grams diethyl carbonate.

When the experiment is repeated with the addition of 10 grams of a biphyllic ligand, triphenylphosphine, the production of diethyl carbonate is inhibited and the only major products are ethyl-beta-ethoxy-propionate and diethyl succinates.

When the experiment is repeated and 0.5 gram palladium acetylacetonate is substituted for the palladium oxide, a similar reaction is observed.

Example 7

Example 6 with the palladium oxide catalyst is repeated; however, the naphthoquinone is not used to illustrate comparative yields in the absence of this cocatalyst. The following yields of products are obtained after a 15 minute reaction period: 69 percent diethyl acetal, 17.1 percent ethyl-beta-ethoxy-propionate and 13.9 percent diethyl succinate.

Example 8

Example 6 is repeated with the substitution of palladium chloride for the palladium oxide previously employed. The following yields of products are recovered after a 15 minute reaction period: 19 percent ethyl acetate; 14.4 percent diethyl acetal; 11 percent ethyl propionate; 7.5 percent ethyl acrylate; 8.9 percent ethyl-beta-ethoxypropionate and 39 percent diethyl succinate. The reaction also yields 10.5 grams diethyl carbonate.

Example 9

To illustrate the reaction in a halide containing reaction medium having no quinone or hydroquinone present, the autoclave is charged with 0.5 gram palladium, 5 grams cupric chloride, 5 grams lithium chloride, 300 grams ethanol, 5 grams sodium bisulfate and 10 grams triphenylphosphine, the latter material being added to inhibit carbonate formation. The autoclave is pressured to 525 p.s.i.g. with carbon monoxide, then an additional 350 p.s.i. with ethylene and heated to and maintained at 250° F. for 30 minutes. The yield of products based on ethylene are: 4.4 percent diethyl acetal; 83.5 percent ethyl propionate; and 12.1 percent diethyl succinate.

In another comparative experiment, the autoclave is charged with 0.5 gram palladium chloride, 5 grams cupric chloride and 300 grams methanol. The autoclave is pressured to 450 p.s.i.g. with ethylene and an additional 450 p.s.i. with carbon monoxide and heated to and maintained at 300° F. for 15 minutes. The yield of products based on ethylene is: 10.1 percent dimethyl acetal; 35.3 percent methyl acetate; 10.5 percent methyl propionate; and 44.1 percent dimethyl succinate. The reaction also produces 5.3 grams dimethyl carbonate.

Example 10

Example 6 is repeated, however, the cupric nitrate redox agent is not used, by charging 0.5 gram palladium oxide, 2.5 grams naphthoquinone, 4 milliliters nitric acid and 300 grams ethanol to the autoclave. The autoclave is pressured to 400 p.s.i.g. with ethylene and then an additional 400 p.s.i. with carbon monoxide and heated to and maintained at 250° F. for 15 minutes. The yield of products based on ethylene are: 25.4 percent acetal; 14.4 percent ethyl-beta-ethoxypropionate; and 60.0 percent diethyl succinate.

Example 11

The autoclave is charged with 0.5 gram palladium chloride, 2.5 grams cupric nitrate, 2.5 grams 1,4-naphthohydroquinone and 300 grams ethanol. The autoclave is pressured to 400 p.s.i.g. with ethylene and an additional 400 p.s.i. with carbon monoxide, then heated to and maintained at 250° F. for a 15 minute period. The yields of products based on ethylene are: 17.3 percent ethyl-beta-ethoxypropionate and 51.0 percent diethyl succinate. The reaction also produces about 7 grams diethyl carbonate.

When the palladium catalyst is replaced with 0.5 gram iridium chloride a similar reaction but at a slower reaction rate is observed.

Example 12

Example 8 is repeated with the substitution of 2.5 grams 2,3-dichloronaphtho-1,4-quinone for the naphthoquinone previously used. The yields of products after 15 minutes are: 8.0 percent acetal, 16.4 percent ethyl-beta-ethoxypropionate and 75.6 percent diethyl succinate. The reaction also produces 9.1 grams diethyl carbonate.

Similar yields of products can be obtained when the quinone previously used is replaced with 3 grams of 7-nitro-1,2-naphthoquinone or 2 grams 2,3-dichloro-5,6-dicyano-1,4-benzoquinone.

Example 13

The invention is applied to vapor phase processing by impregnating 120 grams silica pellets, $\frac{3}{16}$-inch long by $\frac{3}{16}$-inch diameter, with an aqueous solution of 8 grams palladium nitrate, 8 grams cupric nitrate dissolved in 34 milliliters water. The pellets are dried under vacuum for 4 hours at 100° C., then impregnated with 10 grams sodium 1,2-naphthoquinone-4-sulfonate in 50 milliliters water and dried under vacuum for one hour at 80° C.

The catalyst pellets are packed into a U-shaped glass tube fitted with gas introduction and withdrawal tubes at opposite ends and the tube is immersed in a heating bath containing o-dichlorobenzene. A vapor mixture of equal volumes each of air, ethylene, methanol and carbon monoxide is passed through the glass tube while the heating bath is maintained at 180° C. The vapor effluent is passed through several flasks of acetic acid to trap the products. Methyl acrylate, methyl beta-ethoxy propionate and dimethyl succinate are produced by the reaction and the yield of these oxidatively carbonylated products relative to methyl propionate is increased with the catalyst containing the quinone over that obtained with a similar catalyst that does not contain the quinone.

When the reaction is repeated with the substitution of propylene for ethylene, a similar reaction to produce methyl methacrylate, dimethyl pyrotartrate and methyl beta-methoxyisobutyrate is observed.

We claim:

1. The oxidative carbonylation of a hydrocarbon olefin to an ester selected from the class consisting of esters of unsaturated and beta-alkoxy substituted carboxylic acids having one more carbon in the carboxylic acid portion than said olefin, and esters of dicarboxylic acids having two more carbons in the acid portion than said olefin, which comprises contacting, at a temperature from about 25° to about 300° C. and a pressure from atmospheric to about 500 atmospheres, a hydrocarbon olefin having from 2 to about 10 carbons, carbon monoxide and a $C_1$–$C_{10}$ monohydroxy alcohol under substantially anhydrous conditions in the presence of a catalyst comprising Group VIII noble metal in an elevated oxidation state and a cocatalyst selected from the class consisting of quinones or hydroquinones of benzene and naphthalene and derivatives thereof containing up to four ring substituents selected from the class consisting of halo, carboxy, sulfonyl, hydroxy, nitro and cyano groups.

2. The oxidative carbonylation of claim 1 wherein said Group VIII noble metal is palladium.

3. The oxidative carbonylation of claim 2 wherein said contacting is effected in the presence of a salt of multivalent metals having oxidation potentials more positive than said palladium.

4. The oxidative carbonylation of claim 2 wherein said contacting is effected in the presence of from 0.01 to 3.0 nitric acid and alkali metal nitrates or nitrites.

5. The oxidative carbonylation of claim 1 wherein said catalyst is contained in a liquid phase reaction medium.

6. The oxidative carbonylation of claim 1 wherein said olefin is ethylene.

7. The oxidative carbonylation of claim 1 wherein said alcohol is an alkanol having from 1 to 6 carbons.

8. The oxidative carbonylation of claim 1 wherein oxygen is also introduced into contact with the catalyst.

9. The oxidative carbonylation of claim 3 wherein oxygen is also introduced into contact with the catalyst.

10. The oxidative carbonylation of a hydrocarbon olefin to an ester selected from the class consisting of esters of unsaturated and beta-alkoxy substituted carboxylic acids having one more carbon in the carboxylic acid portion than said olefin and esters of saturated dicarboxylic acids having two more carbons in the acid portion than said olefin, which comprises contacting, at a temperature of from about 25° to about 300° C. and at a pressure of from atmospheric to about 500 atmospheres, a hydrocarbon olefin having from 2 to about 10 carbons, carbon monoxide, oxygen and a $C_1$ to $C_{10}$ monohydroxy alcohol under substantially anhydrous conditions in the presence of a catalyst comprising a Group VIII noble metal in an elevated oxidation state, a redox agent comprising a salt of a multivalent metal or a soluble nitrate on nitrite salt having an oxidation potential more positive than said platinum group metal and a cocatalyst selected from the class consisting of quinones or hydroquinones of benzene and naphthalene and derivatives thereof containing up to four ring substituents selected from the class consisting of halo, carboxy, sulfonyl, hydroxy, nitro and cyano groups.

11. The oxidative carbonylation of claim 10 wherein said contacting is effected in the presence of a biphyllic ligand having the structure:

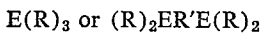

wherein:

E is a trivalent atom selected from the class consisting of phosphorus, arsenic and antimony;

R is the same or different member of the class consisting of alkyl having from 1 to 8 carbons and aryl having from 6 to 8 carbons; and R' is alkylene having from 1 to about 8 carbons.

12. The oxidative carbonylation of claim 11 wherein said biphyllic ligand is triphenyl phosphine.

13. The oxidative carbonylation of claim 12 wherein said redox agent is a soluble cupric salt.

References Cited
UNITED STATES PATENTS

| | | | |
|---|---|---|---|
| 3,470,230 | 9/1969 | Hirsch et al. | 260—484 X |
| 3,530,168 | 9/1970 | Biale | 260—486 AC |

LORRAINE A. WEINBERGER, Primary Examiner

P. J. KILLOS, Assistant Examiner

U.S. Cl. X.R.

260—410.9 R, 463, 468 K, 476 R, 485 R, 486 AC, 497 A, 615 AA